(12) United States Patent
Vergis et al.

(10) Patent No.: US 11,589,103 B2
(45) Date of Patent: *Feb. 21, 2023

(54) DYNAMIC LINKING OF CODESETS IN UNIVERSAL REMOTE CONTROL DEVICES

(71) Applicant: Universal Electronics Inc., Scottsdale, AZ (US)

(72) Inventors: George Vergis, Fremont, CA (US); Sunilkumar Mankame, Bangalore (IN)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,826

(22) Filed: Jan. 10, 2022

(65) Prior Publication Data
US 2022/0132195 A1  Apr. 28, 2022

Related U.S. Application Data

(63) Continuation of application No. 16/056,878, filed on Aug. 7, 2018, now Pat. No. 11,259,067, which is a continuation of application No. 15/864,249, filed on Jan. 8, 2018, now Pat. No. 10,097,784, which is a continuation of application No. 15/426,297, filed on Feb. 7, 2017, now Pat. No. 9,918,034, which is a continuation of application No. 13/005,017, filed on Jan. 12, 2011, now Pat. No. 9,621,836, which is a
(Continued)

(51) Int. Cl.
*H04N 21/422* (2011.01)
*G08C 19/28* (2006.01)
*G08C 17/02* (2006.01)
*G08C 19/36* (2006.01)

(52) U.S. Cl.
CPC ....... *H04N 21/42204* (2013.01); *G08C 17/02* (2013.01); *G08C 19/28* (2013.01); *G08C 19/36* (2013.01); *H04N 21/42225* (2013.01); *G08C 2201/20* (2013.01)

(58) Field of Classification Search
CPC ....... H04N 21/42204; H04N 21/42225; G08C 17/02; G08C 19/28; G08C 19/36; G08C 2201/20
See application file for complete search history.

(56) References Cited

U.S. PATENT DOCUMENTS 4,866,434 A * 9/1989 Keenan .................. G08C 19/28
398/112
5,099,233 A * 3/1992 Keenan ............... G06F 12/0223
340/9.1
(Continued)

*Primary Examiner* — Amine Benlagsir
(74) *Attorney, Agent, or Firm* — Greenberg Traurig, LLP

(57) ABSTRACT

A codeset having function-code combinations is provisioned on a controlling device to control functions of an intended target device. Input is provided to the controlling device which designates a function to be controlled on the intended target device. From a plurality of codes that are each associated with the designated function in a database stored in a memory of the controlling device a first code that is determined to be valid for use in controlling the designated function on the intended target device is selected. When the codeset is then provisioned on the controlling device, the provisioned codeset includes as a function-code combination thereof the designated function and the first code.

13 Claims, 6 Drawing Sheets

Related U.S. Application Data continuation of application No. 11/655,419, filed on Jan. 19, 2007, now Pat. No. 7,889,112.

(56) References Cited

U.S. PATENT DOCUMENTS

| | | | | |
|---|---|---|---|---|
| 5,228,077 A | * | 7/1993 | Darbee | H04B 10/114 |
| | | | | 348/478 |
| 5,282,028 A | * | 1/1994 | Johnson | H04N 21/84 |
| | | | | 348/E7.071 |
| 5,515,052 A | * | 5/1996 | Darbee | H03J 1/0025 |
| | | | | 398/1 |
| 5,614,906 A | | 3/1997 | Hayes | |
| 5,644,303 A | | 7/1997 | Gioscia | |
| 5,850,304 A | * | 12/1998 | Elmers | H04B 10/114 |
| | | | | 348/E5.103 |
| 5,987,256 A | * | 11/1999 | Wu | G06F 9/451 |
| | | | | 717/146 |
| 6,008,735 A | | 12/1999 | Chiloyan | |
| 6,014,092 A | | 1/2000 | Darbee | |
| 6,111,569 A | | 8/2000 | Brusky | |
| 6,195,033 B1 | * | 2/2001 | Darbee | H04B 10/114 |
| | | | | 341/23 |
| 6,236,350 B1 | | 5/2001 | Andrews | |
| 6,407,779 B1 | | 6/2002 | Herz | |
| 6,496,135 B1 | | 12/2002 | Darbee | |
| 6,507,306 B1 | | 1/2003 | Griesau et al. | |
| 6,587,067 B2 | | 7/2003 | Darbee | |
| 7,286,076 B1 | * | 10/2007 | Provis | G08C 17/02 |
| | | | | 341/173 |
| 7,339,513 B1 | * | 3/2008 | Provis | H04N 21/41265 |
| | | | | 340/12.15 |
| 7,362,256 B1 | * | 4/2008 | Provis | H04L 1/1803 |
| | | | | 340/12.15 |
| 7,589,642 B1 | * | 9/2009 | Mui | G08C 17/02 |
| | | | | 340/12.3 |
| 7,746,244 B2 | | 6/2010 | Wouters | |
| 2002/0194621 A1 | | 12/2002 | Tran et al. | |
| 2004/0189508 A1 | * | 9/2004 | Nguyen | G08C 17/02 |
| | | | | 341/176 |
| 2005/0057369 A1 | | 3/2005 | Lai | |

* cited by examiner

DYNAMIC LINKING OF CODESETS IN UNIVERSAL REMOTE CONTROL DEVICES

RELATED APPLICATION INFORMATION

This application is a continuation of and claims the benefit of U.S. application Ser. No. 16/056,878, filed on Aug. 7, 2018, which application is a continuation of and claims the benefit of U.S. application Ser. No. 15/864,249, filed on Jan. 8, 2018, which application is a continuation of and claims the benefit of U.S. application Ser. No. 15/426,297, filed on Feb. 7, 2017, which application claims the benefit of and is a continuation of U.S. application Ser. No. 13/005,017, filed on Jan. 12, 2011, which application claims the benefit of and is a continuation of U.S. application Ser. No. 11/655,419, filed on Jan. 19, 2007, the disclosures of which are each incorporated herein by reference in their entirety.

TECHNICAL FIELD

The disclosed embodiments relate to dynamic linking of multiple codesets for generating operational signals, such as those transmitted from a universal remote control device.

BACKGROUND

A universal remote control device transmits operational signals to control one or more electronic consumer devices such as TVs, VCRs, cable set-top boxes, and CD/DVD players. Each operational signal communicates a keycode associated with a selected electronic consumer device. Each keycode corresponds to a function of the selected electronic consumer device, such as power on, power off, volume up, volume down, play, stop, select, channel up, channel down, etc. A particular brand and make of electronic consumer device responds to operational signals containing a particular set of keycodes and performs the corresponding functions.

In order to provide the functionality of a universal remote control device, various types of keycodes are stored in codesets as a codeset database format. Each codeset is identified by a three digit device code associated with a particular brand and make of an electronic consumer device.

There are more than ten thousand codesets used in the market. Because of the large number of different electronic consumer devices, the amount of memory space required to store the entire codeset database is large. Various compression schemes are used to store the codeset database with reduced memory. Typically, a universal remote control device stores less than one thousand codesets due to limited memory space.

After a universal remote control device has been manufactured, it is likely that the remote control does not have a particular codeset that contains all the keycodes corresponding to all functions of a particular brand and make of a consumer electronic device. For instance, the remote control device is able to control the power, volume, and channel of a television when it is programmed to use codeset #1. However, the remote control device cannot control the picture-in-picture function of the TV when it is programmed to use codeset #1. On the other hand, the remote control device is able to control the picture-in-picture function of the TV when it is programmed to use codeset #2. However, when the remote control device is programmed to use codeset #2, it cannot control the power, volume, and channel of the TV.

Some remote control devices provide additional programmable keys on the remote control device to allow the user to define his/her own desired keycodes. However, the number of programmable keys available on a remote control device is limited. The programmable keys are therefore usually used for advanced functions. Some other remote control devices provide a "key mover" feature which allows a user to reassign a function associated with one key to another key. The "key mover" feature increases flexibility, but it does not solve the problem that a particular codeset does not contain all keycodes corresponding to all functions of a selected electronic consumer device.

Sometimes it is also desirable for a user to be able to control multiple electronic consumer devices without having to reprogram the universal remote control device.

For instance, a user may want to be able to control the power of multiple devices types. The "punch through" feature works for a predefined set of keys, typically, the TV channel and volume up/down keys. Another feature known as "double-press" is available on some remote control devices. The "double-press" feature of the power key is, however, hard to use and inflexible, because the user either has to turn on the power of all the devices or has to turn off the power of all the devices by double-pressing the power key quickly.

A solution is desired.

SUMMARY

A universal remote control device stores various codesets to control various types of electronic consumer devices. A user programs the universal remote control device to use a selected codeset to control a selected electronic consumer device. Typically, a universal remote control device stores a few hundred codesets (less than one thousand codesets) due to limited memory space. Therefore, it is likely that a universal remote control device does not have a particular codeset that contains all the keycodes corresponding to all functions of a particular brand and make of electronic consumer device. Moreover, it is likely that a universal remote control device is not able to control different types of electronic consumer devices without being programmed with different codesets.

In one example, a user programs a universal remote control device to use codeset #1 that contains a set of keycodes to control a particular brand and make of electronic consumer device. The selected electronic consumer device responds to operational signals communicating the keycodes and performs the corresponding functions. However, the selected electronic consumer device does not respond and perform a desired function when the user presses KEY X on the remote control device.

In one embodiment, the user presses a predefined sequence of keys on the remote control device to search (sometimes called "auto scan") for the keycode associated with KEY X for the selected electronic consumer device. Suppose that the keycode is found in codeset #2. The user then presses KEY X in combination with another predefined key on the remote control device to "dynamically link" the keycode in codeset #2 to codeset #1. A keycode link routine executing on a processor inside the remote control device generates keycode link information and stores the keycode link information in a volatile memory space. The keycode link information includes a codeset identifier of codeset #2 and a key identifier of KEY X associated with the keycode. Thereafter, when the user presses KEY X, the remote control device uses the keycode link information to access codeset

2 and then generates an operational signal communicating the keycode associated with KEY X. The selected electronic consumer device responds to the operational signal and performs the desired function.

In another example, a user programs a universal remote control device to use codeset #1. Codeset #1 contains a set of keycodes to control a first electronic consumer device. However, the user also wishes to control a second electronic consumer device that performs a desired function without reprogramming the universal remote control device with a different codeset. Suppose that KEY Y corresponds to the desired function.

In one embodiment, the user presses a predefined sequence of keys on the remote control device to search for ("auto scan" for) the keycode that corresponds to the desired function of the second electronic consumer device. Suppose that the keycode is found in codeset #2. The user then presses KEY Z in combination with another predefined key on the remote control device to "dynamically link" the keycode in codeset #2 to codeset #1. A keycode link routine executing on a processor inside the remote control device generates keycode link information and stores the keycode link information in a volatile memory space. In this example, KEY Y is used to control the first electronic consumer device for the desired function. The user links both KEY Z and the keycode associated with KEY Y in codeset #2 to codeset #1 such that KEY Z can be used to control the second electronic consumer device for the same function. Therefore, the keycode link information includes a codeset identifier of codeset #2, a key identifier of KEY Y, and a key identifier of KEY Z. Thereafter, when the user presses KEY Z, the remote control device uses the keycode link information to access codeset #2 and then generates an operational signal communicating the keycode associated with KEY Y. The second electronic consumer device responds to the operational signal and performs the desired function.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
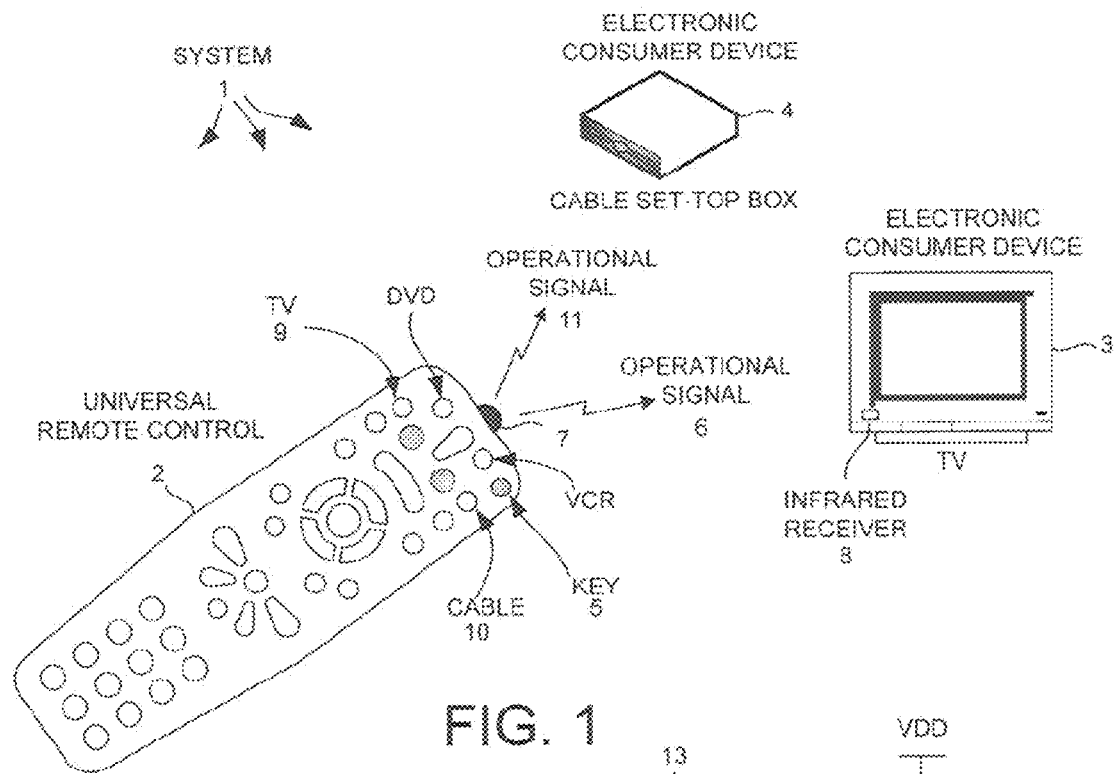
FIG. 1 illustrates a system in accordance with one novel aspect.

FIG. 1 is a diagram of a system 1 in accordance with, one novel aspect. System 1 includes a remote control device 2, a first electronic consumer device 3, and a second electronic consumer device 4. A user uses remote control device 2 to control a selected electronic consumer device. Although an ordinary handheld infrared remote control device is depicted, the remote control device can take other forms and may, for example, be a personal digital assistant (PDA), or personal computer or any other suitable device. In the example of FIG. 1, the user may press key 5 on remote control device 2 to turn on/off the power of the first electronic consumer device 3, a television. When the user presses key 5, remote control device 2 emits an operational signal 6 from a LED (light emitting diode) 7. Operational signal 6 is transmitted to an infrared receiver 8 of TV 3. Infrared receiver 8 interprets operational signal 6 and takes appropriate action, which in this case is to turn on the TV if it is off, or to turn off the TV if it is on.

Remote control device 2 of FIG. 1 is a universal remote control device. The user programs remote control device 2 to send out operational signals to control several types of electronic consumer devices, such as TVs, VCRs, cable set-top boxes, and CD/DVD players. For example, to program remote control device 2 to control a particular brand and make of TV 3, the user first presses device key 9 for device type "TV", and then inputs a three digit device code. Thereafter, when the user presses key 5, operational signal 6 is transmitted to control TV 3. Similarly, to program remote control device 2 to control a particular brand and make of cable set-top box 4, the user first presses the device key 10 for device type "cable", and then inputs a three digit device code. Thereafter, when the user presses key 5, operational signal 11 is transmitted to control cable set-top box 4.

Figure 2:
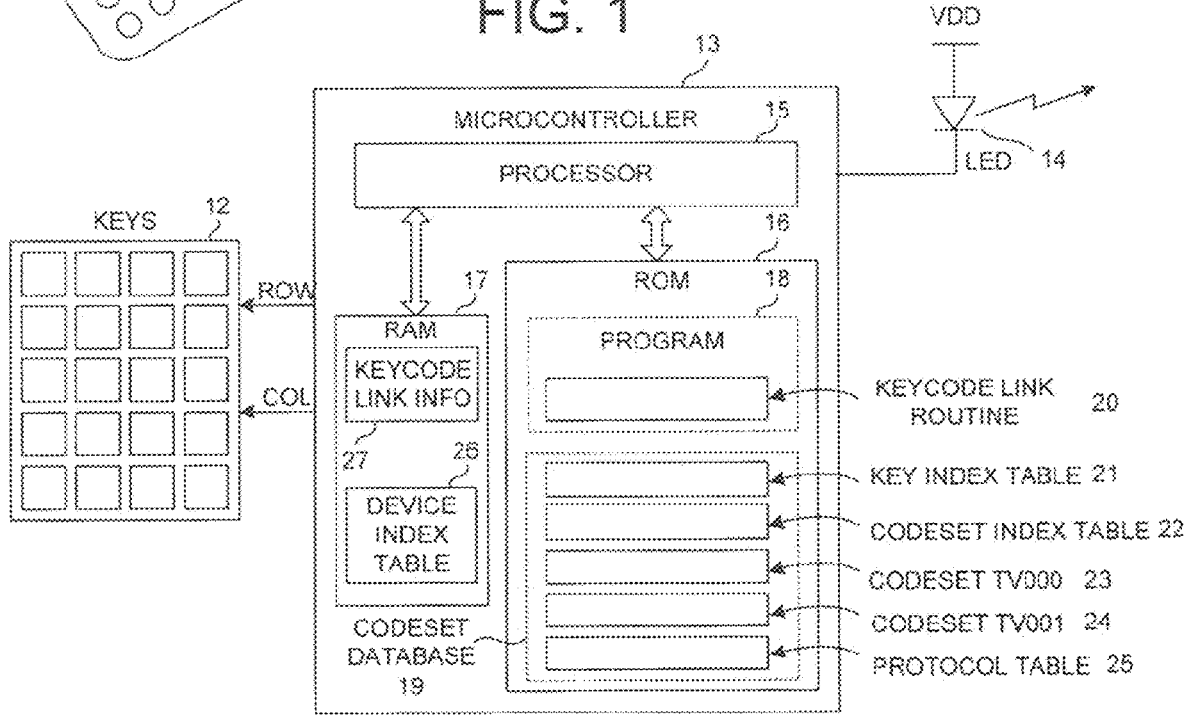
FIG. 2 is a simplified diagram of a circuit within a universal remote control device.

FIG. 2 is a simplified diagram of a circuit within remote control device 2 of FIG. 1. The circuit of FIG. 2 includes a set of keys 12, a microcontroller integrated circuit 13, and an infrared LED 14. Microcontroller 13 includes a processor 15, a read-only memory (ROM) 16, and a random-access memory (RAM) 17. ROM 16 stores software program 18 executable by processor 15 and a codeset database 19 (sometimes referred as a codeset library). Program 18 includes a keycode link routine 20. Codeset database 19 includes a key index table 21, a codeset index table 22, a set of codesets 23, 24 (for instance, codeset TV000 and TV001 as illustrated), and a protocol table 25. RAM 17 stores a device index table 26, and keycode link information 27. Microcontroller 13 performs key-scanning and determines the row and column coordinates of any key that is pressed by the user.

Figure 3:
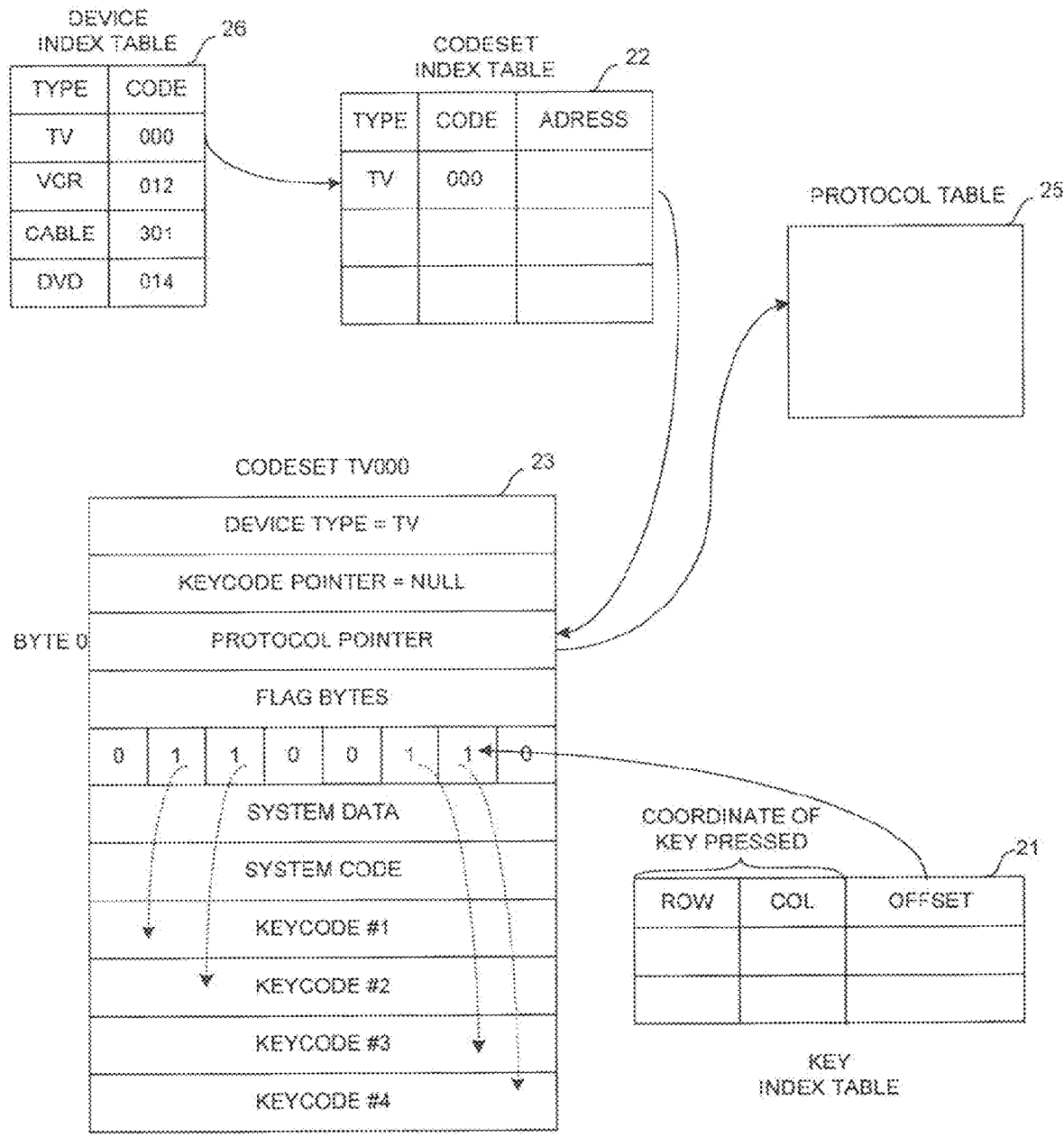
FIG. 3 is a detailed diagram of a device index table, a codeset index table, a protocol table, a key index table, and two codesets of FIG. 2.

FIG. 3 is a detailed diagram of device index table 26, codeset index table 22, protocol table 25, keycode index table 21, and codeset 23 of FIG. 2. When a user presses a key on remote control device 2 of FIG. 1, processor 15 of FIG. 2 accesses device index table 26 to obtain the three digit device code that the user has programmed (for instance, 000 for TV device type). Processor 15 then accesses codeset index table 22 to obtain the byte 0 address of codeset 23 corresponding to the three digit device code (for instance, codeset TV000 as illustrated). Processor 15 also accesses key index table 21 to obtain the offset value of the flag bit (in the flag bytes of codeset 23) corresponding to the key coordinates that the user has pressed. Using the offset value, processor 15 identifies the flag bit in codeset 23 and determines whether the keycode of the pressed key is present in codeset 23. The keycode of the pressed key is present if the flag bit is of value 1. The keycode of the pressed key is not present if the flag bit is of value 0. If the keycode is found in codeset 23, then processor 15 uses the keycode to generate an operational signal according to the timing and modulation scheme information of protocol table 25 (sometimes the timing and modulation scheme information is included within the keycode).

Figure 4:
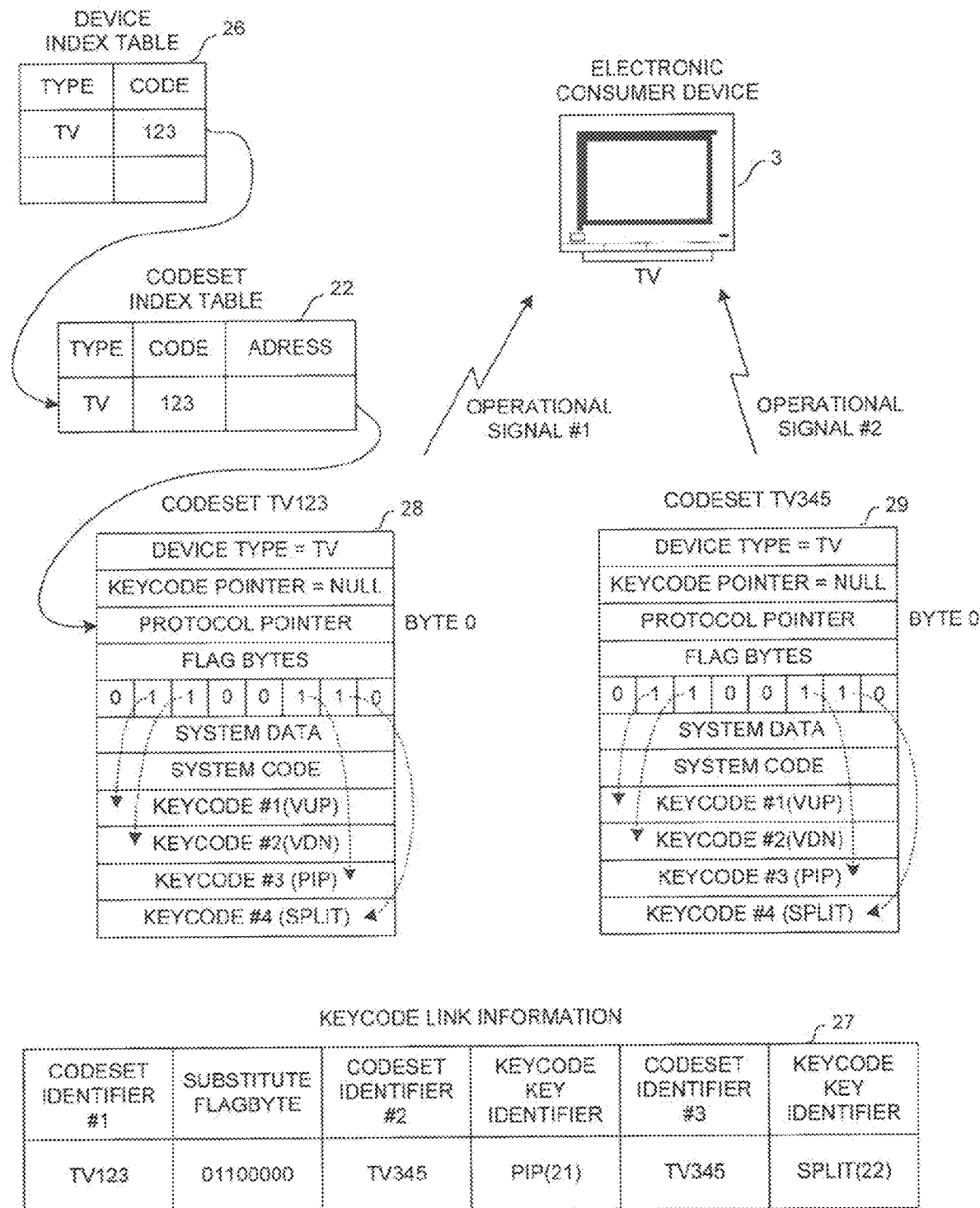
FIG. 4 illustrates an example of dynamic linking of two codesets in accordance with one novel aspect.
Figure 5:
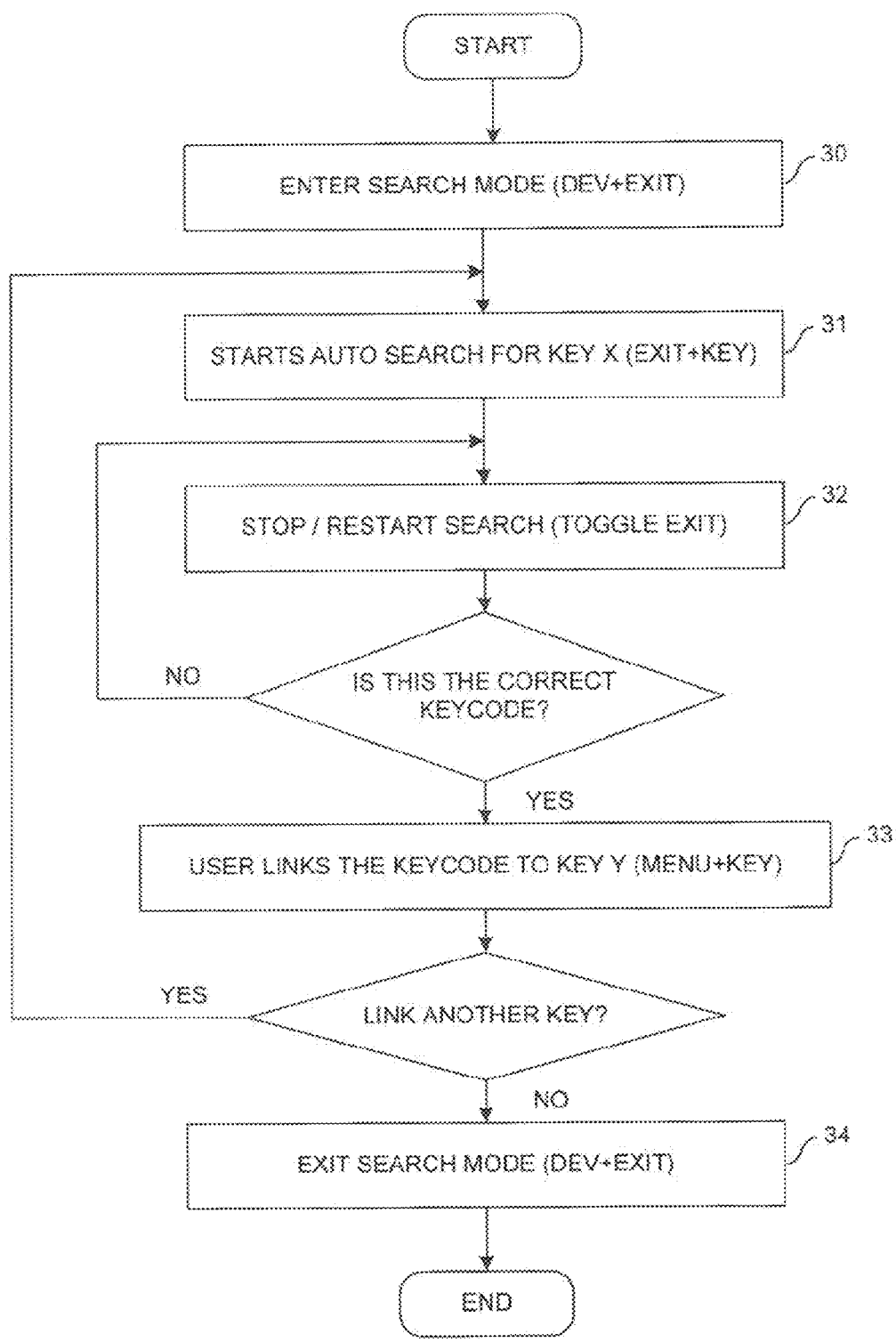
FIG. 5 is a flow chart of a method of dynamic linking of two codesets.

FIG. 4 is a diagram of a device index table 26, a codeset index table 22, two codesets 28, 29, keycode link information 27, and electronic consumer device TV 3 that are involved in a method of dynamic linking of two codesets in accordance of one novel aspect. FIG. 5 is a flow chart of the dynamic linking method that links codesets 28 and 29.

Figure 6:
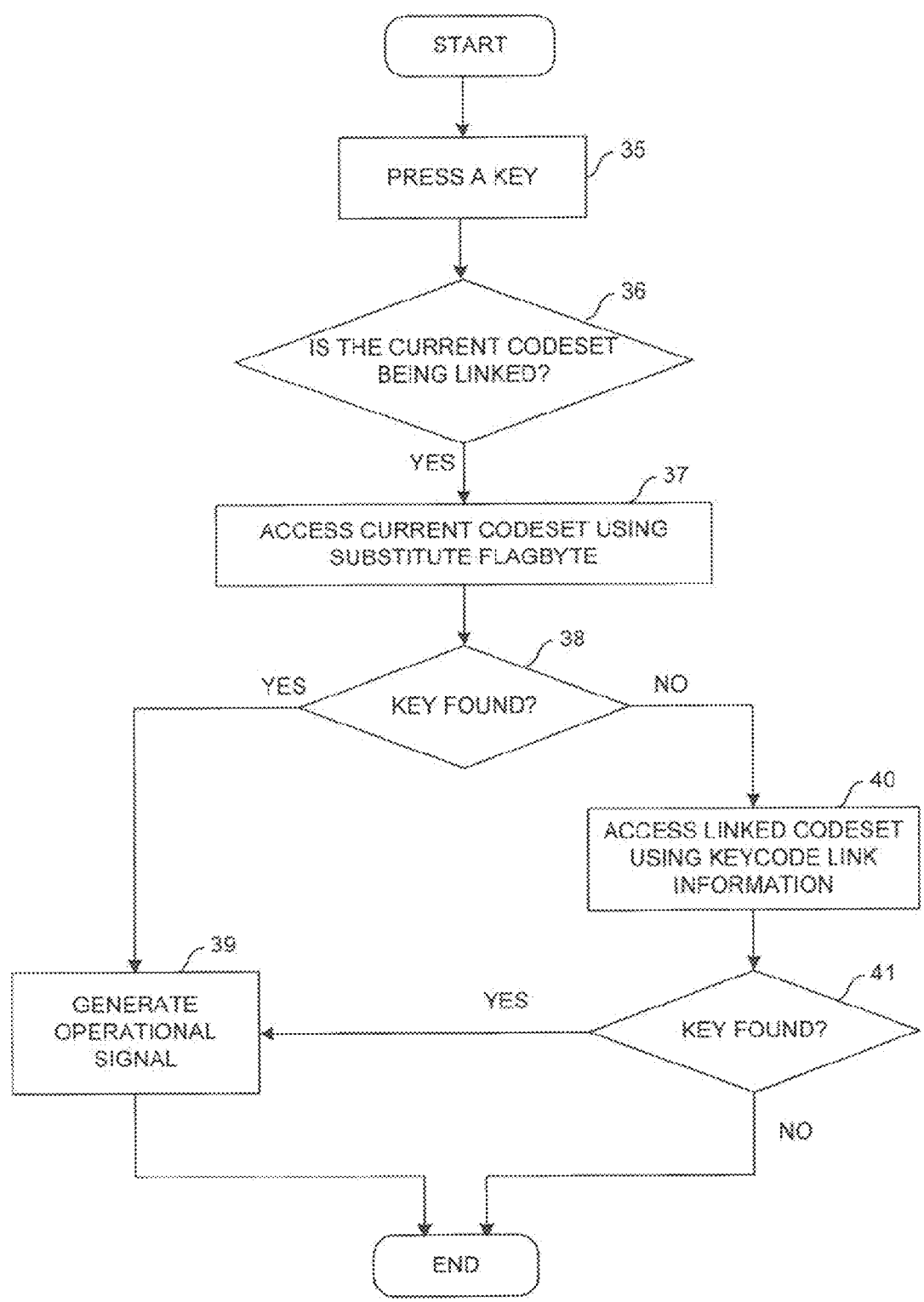
FIG. 6 is a flow chart of a method of using keycode link information to access dynamically linked codesets.

FIG. 6 is a flow chart of accessing the linked codesets 28 and 29 using keycode linking information 27.

In the example of FIG. 4, remote control device 2 is programmed to control a particular brand and make of TV 3 using codeset 28 (TV123). Codeset TV123 contains various keycodes (for instance, keycodes #1-#4 are illustrated) corresponding to different keys on remote control device 2. Suppose that keycode #1 is associated with the volume up (VUP) key, keycode #2 is associated with the volume down (VDN) key, keycode #3 is associated with the picture-in-picture (PIP) key and keycode #4 is associated with the split-picture (SPLIT) key. When a user presses the VUP key on remote control device 2, processor 15 of FIG. 2 accesses codeset TV123 and determines whether the keycode of the pressed VUP key is present in codeset TV123. In this particular example, the flag byte has a value of 01100110, with flagbit #1=0, flagbit #2=1, flagbit #3=1, and so forth. Assume that the VUP key is indicated by flagbit #2 according to the offset value of key index table 21 of FIG. 3. Because flagbit #2 has a digital value of 1, processor 15 determines that keycode #1 associated with the VUP key is present in codeset TV123 and uses keycode #1 to generate an operational signal to increase the volume of TV 3. Similarly, when the user presses the PIP key, processor 15 accesses codeset TV123 and determines whether the PIP key is present in codeset TV123. Assume that the PIP key is indicated by flagbit #6 according to the offset value of key index table 21 of FIG. 3. Because flagbit #6 has a digital value of 1, processor 15 determines that keycode #3 associated with the PIP key is present in codeset TV123 and uses keycode #3 to generate an operational signal to display a picture-in-picture screen on TV 3.

In one situation, most of the functions of TV 3 are performed correctly by pressing the corresponding keys on remote control device 2 that is programmed to use codeset TV123. For instance, TV 3's power is turned on/off when the power key is pressed, its channel goes up/down when the channel up/down key is pressed, and its volume goes up/down when the volume up/down key is pressed. However, the picture-in-picture screen is not displayed on TV 3 when the PIP key is pressed. Although codeset TV123 includes keycode #3 associated with the PIP key, the operational signal generated using keycode #3 in codeset TV123 does not perform the desired picture-in-picture function for TV 3. In the example of FIG. 4, there is another codeset 29 (TV345) that is also stored in ROM 18 of remote control device 2. Codeset TV345 contains various keycodes including keycode #3 associated with the PIP key. In another situation, most of the functions of TV 3 are not performed correctly by pressing the corresponding keys on remote control device 2 that is programmed to use codeset TV345. However, the picture-in-picture screen is displayed on TV 3 when the PIP key is pressed. Therefore, if the user programs remote control device 2 to use codeset TV123, then most of the keys on remote control device 2 work properly except for the PIP key. On the other hand, if the user programs remote control device 2 to use codeset TV345, then the PIP key works properly except for most of the other keys.

FIG. 5 illustrates a method of dynamic linking of codeset TV123 and TV345 such that the PIP key also works properly for remote control device 2 that is programmed to use codeset TV123. In the example of FIG. 5, remote control device 2 is programmed to use codeset TV123 to control TV 3 and most of the keys work properly except for the PIP key. In the first step 30 of FIG. 5, the user presses and holds the TV device key, and then presses and releases the EXIT key to enter a search mode. In step 31, the user presses and holds the EXIT key, and then presses and releases the PIP key to start automatic searching for keycodes associated with the PIP key. During the auto search (also called "auto scan"), the remote control device transmits operational signals corresponding to keycodes associated with the Pi P key starting from codeset TV000, TV001, TV002, and so forth. There is a 5 second gap between successive transmissions. When a picture-in-picture screen appears on TV 3, the user stops the auto search by pressing the EXIT key (step 32). An identifier of the codeset just transmitted (for instance, TV345) is saved in a temporary location. The user then decides either to restart or to stop the search by toggling the EXIT key. In order to link the keycode associated with the PIP key, the user presses and holds the MENU key, and then presses and releases the PIP key (step 33). The user continues this searching and linking operation by going back to step 31. Otherwise, in step 34, the user exits the search mode by pressing the TV device key and the EXIT key together.

When two codesets are dynamically linked in step 33 of FIG. 5, keycode link routine 20 generates and stores keycode link information 27 in RAM 17 of FIG. 2. In the example of FIG. 4, keycode link information 27 includes the programmed codeset identifier #1 (for instance, TV123), the linked codeset identifier #2 (for instance, TV345), and a keycode key identifier (for instance, value 21 as illustrated) of the linked PIP key. A key identifier is a value that represents a key on a remote control device. The key identifier is used to determine the coordinate of the pressed key in the key index table. In the example of FIG. 4, keycode link information 27 also includes a substitute flag byte, with a new value of 01100000 as compared to the original value of 01100110. In the substitute flag byte, flagbit #6 has a new digit value of 0 indicating that the keycode associated with the PIP key in codeset TV123 no longer exists (is no longer to be used).

FIG. 6 is a flow chart of a method of accessing the linked codesets using keycode link information 27 after codesets TV123 and TV345 have been dynamically linked. In one scenario, the user presses the VUP key in step 35. In the next step 36, processor 15 determines whether the programmed codeset TV123 is dynamically linked by examining keycode link information 27. In this example, codeset TV123 is linked because keycode link information 27 contains codeset identifier #1, TV123. Processor 15 then uses the substitute flag byte to access codeset TV123 in step 37. Because flagbit #2 has a digital value of 1 in the substitute flagbyte, processor 15 determines in step 38 that keycode #1 associated with the VUP key is present in codeset TV123. In step 39, processor 15 uses keycode #1 in TV123 to generate operational signal #1 of FIG. 4 to increase the volume of TV 3.

In another scenario, the user presses the PIP key in step 35. Processor 15 then determines (step 36) that the programmed codeset TV123 is linked. Processor 15 then uses the substitute flag byte to access codeset TV123 in step 37.

Because flagbit #6 has a digital value of 0 in the substitute flag byte, processor 15 determines in step 38 that keycode #3 associated with the PIP key in codeset TV123 is no longer present (is no longer to be used). In step 40, processor 15 uses the codeset identifier #2 in keycode link information 27 to access codeset TV345. In step 41, processor 15 uses the keycode key identifier in keycode link information 27 to obtain the key coordinate of the PIP key. Because the key coordinate matches the pressed PIP key, processor 15 then uses the keycode key identifier to determine that keycode #3 associated with the PIP key is present in codeset TV345. Finally, in step 39, processor 15 uses keycode #3 in codeset TV345 to generate operational signal #2 of FIG. 4 to display a picture-in-picture screen on TV 3. Thus, without reprogramming remote control device 2, both VUP key and PIP key perform their corresponding functions properly when remote control device 2 is programmed to use codeset TV123.

In the above example, only one keycode associated with the PIP key in codeset TV345 is linked to codeset TV123. Because the picture-in-picture function is closely related to the split-screen function, it is very likely that the keycode associated with the SPLIT key in codeset TV345 also works for the same electronic consumer device TV 3.

In one method, the PIP key and the SPLIT key are predefined such that they belong to the same cluster of keys. A cluster is a set of keys that is associated with a given set of functions. If a key in a cluster is in two different codesets, then there is a high probability that other keys in the cluster will also be present in both codesets. When the PIP key in codeset TV345 is linked to codeset TV123, the SPLIT key, as a member of the same cluster of keys, is automatically linked to codeset TV123 as well. As illustrated in FIG. 4, keycode link information 27 also includes the SPLIT key identifier. When the user presses the SPLIT key, processor 15 follows the steps illustrated in FIG. 6 and uses keycode #4 in codeset TV345 to generate an operational signal to display a split screen on TV 3.

Figure 7:
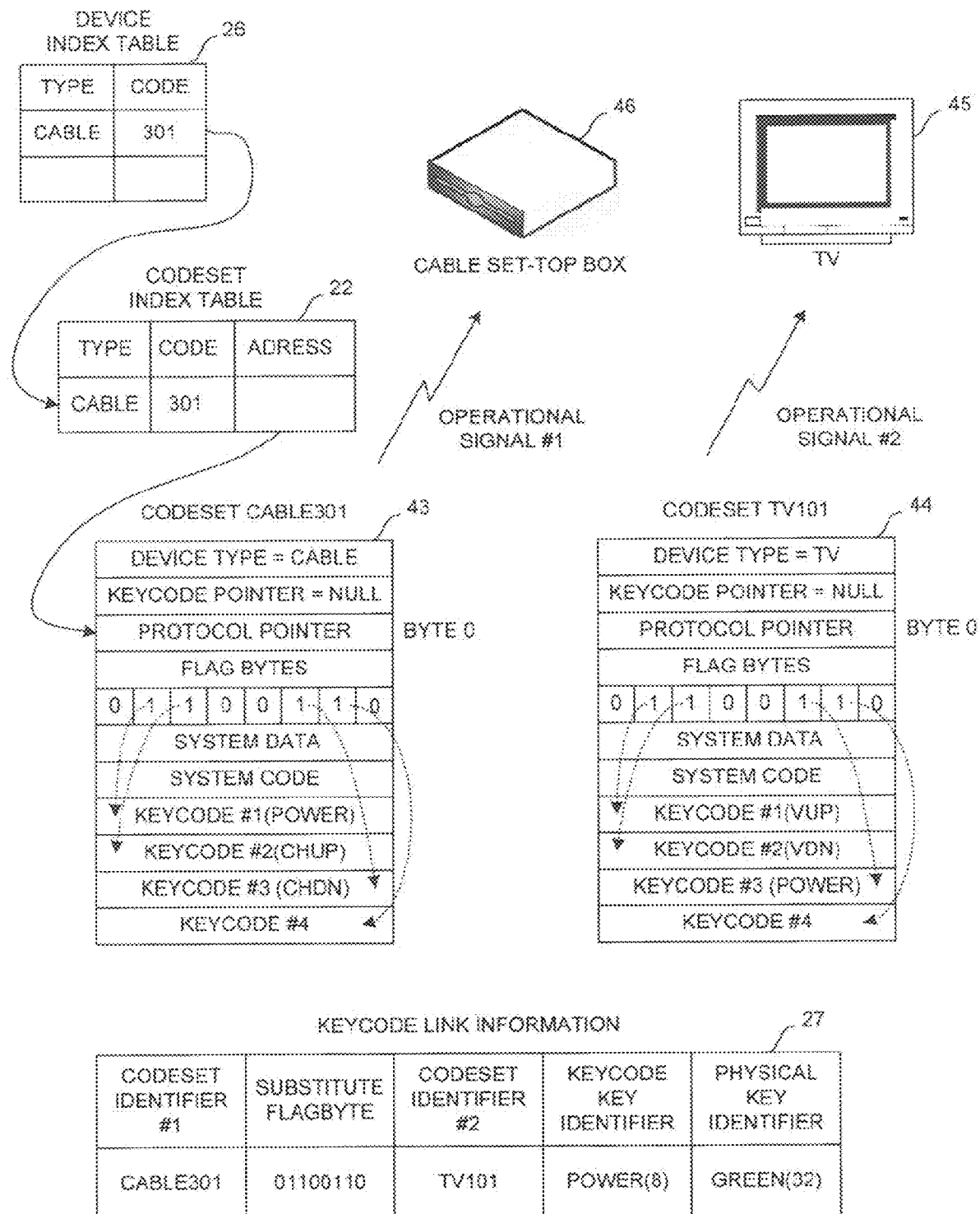
FIG. 7 illustrates another example of dynamically linked codesets involved in the methods of FIGS. 5 and 6.

FIG. 7 illustrates another example of dynamic linking of two codesets in accordance with one novel aspect. FIG. 7 is a diagram of device index table 26, codeset index table 22, two codesets 43, 44, keycode link information 27, and two electronic consumer devices 45, 46 that are involved in the dynamic linking method.

In the example of FIG. 7, remote control device 2 is programmed with codeset CABLE301 to control cable set-top box 46. The user uses remote control device 2 to turn on/off the power and to change the channel selected by cable set-top box 46. However, in order to turn on/off the power of TV 45, the user has to reprogram remote control device 2 to use codeset TV101 by pressing the TV device key. The user follows the steps in FIG. 5 to link the two codesets CABLE301 and TV101. The user first follows step 30 of FIG. 5 to enter the search mode. In step 31, the user presses the EXIT and the POWER key together to start automatic searching for keycodes associated with the POWER key. When TV 45 is powered on, the user stops the auto search by pressing the EXIT key (step 32). An identifier of the codeset just transmitted (for instance, TV101) is saved in a temporary location. In step 33, to link the keycode associated with the POWER key, the user presses and holds the MENU key, and then presses and releases a key other than the power key (for instance, a GREEN key on the remote control device that is ordinarily not used). The user finally exits the search mode by pressing the TV device key and the EXIT key together (step 34).

In this particular example, because the POWER key is used to control the power of cable set-top box 46, the user links the keycode of the POWER key in TV001 with a different physical key to control TV 45. When keycode link routine 20 executes, it stores keycode link information 27 in RAM 17 of FIG. 2. In the example of FIG. 7, keycode link information 27 includes the programmed codeset identifier #1 (for instance, CABLE301), the linked codeset identifier #2 (for instance, TV101), a keycode key identifier (for instance, value 6 as illustrated) of the linked POWER key, and a physical key identifier (for instance, value 32 as illustrated) of the GREEN key. Keycode link information 27 also includes a substitute flag byte which remains unchanged in this example.

Following the steps illustrated in FIG. 6, when the user presses a key (for instance the channel up key) on remote control device 2 that is programmed to use codeset CABLE301, processor 15 first determines that codeset CABLE301 is linked to another codeset because keycode link information 27 contains the codeset identifier #1, CABLE301. Processor 15 then accesses CABLE301 using the substitute flag byte in keycode link information 27. In this example, processor 15 determines that keycode #1 associated with the CHUP key is present in CABLE301. In step 39 of FIG. 6, processor 15 uses keycode #1 in codeset CABLE301 to generate operational signal #1 of FIG. 7 to increase the channel number selected by cable set-top box 46.

When the user later presses the GREEN key, processor 15 also accesses CABLE301 using the substitute flag byte and determines that the keycode for the GRENN key is not present in codeset CABLE301. Processor 15 then uses the codeset identifier #2 in keycode link information 27 to access—codeset TV101. In step 41, processor 15 uses the physical key identifier in keycode link information 27 to determine the key coordinate of the GREEN key. Because the key coordinate matches the pressed GREEN key, processor 15 then uses the keycode key identifier to determine that keycode #3 associated with the POWER key is present in codeset TV101. Finally, in step 39, processor 15 uses keycode #3 in codeset TV101 to generate operational signal #2 of FIG. 7 to turn on/off the power of TV 45.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A method performed by a controlling device for commanding a functional operation of a controlled device, comprising:

responding to a one of a plurality of input elements of the controlling device being activated by determining if a first keycode present in a first preset codeset stored in a memory, having keycodes linked to other ones of the plurality of input elements of the controlling device, is linked to the activated one of the plurality of input elements of the controlling device and, when it is determined that the first keycode present in the first preset codeset stored in the memory is not linked to the activated one of the plurality of input elements of the controlling device, automatically causing a second keycode from a second preset codeset that was linked to the activated one of the plurality of input elements of the controlling device to be used to generate a command for transmission to the controlled device via use of a transmitter of the controlling device.

2. The method as recited in claim 1, wherein the second preset codeset is stored in the memory of the controlling device.

3. The method as recited in claim 1, further comprising receiving first input into the controlling device to link the keycodes in the first preset codeset to the other ones of the plurality of input elements of the controlling device.

4. The method as recited in claim 3, further comprising receiving second input into the controlling device to unlink the first keycode in the first preset codeset from the one of the plurality of input elements of the controlling device and to link the second keycode from the second preset codeset to the one of the plurality of input elements of the controlling device.

5. The method as recited in claim 4, further comprising causing a flag bit in the first preset codeset to be set to a value to indicate that the first keycode in the first preset codeset has been unlinked from the one of the plurality of input elements of the controlling device.

6. The method as recited in claim 5, further comprising causing a pointer to the second codeset to be stored in the first preset codeset for use in linking the second keycode from the second present codeset to the one of the plurality of input elements of the controlling device.

7. The method as recited in claim 4, wherein the second input is provided to the controlling device in connection with an execution by the controlling device of an auto-scan procedure.

8. The method as recited in claim 1, wherein the first preset code set and the second preset codeset are each intended for use in commanding functional operations of the controlled device of a same type.

9. The method as recited in claim 1, wherein the first preset code set and the second preset codeset are each intended for use in commanding functional operations of the controlled device of a different type.

10. The method as recited in claim 1, further comprising checking a status of a flag bit associated with the first preset codeset when determining if the first keycode present in the first preset codeset stored in the memory is linked to the activated one of the plurality of input elements of the controlling device.

11. The method as recited in claim 1, further comprising using timing and modulation scheme information associated with the second preset codeset when transmitting the command to the controlled device via use of the transmitter.

12. The method as recited in claim 1, wherein the transmitter comprises an infrared transmitter.

13. The method as recited in claim 1, wherein the transmitter comprises a radio frequency transmitter of the controlling device.

* * * * *